US010630852B2

(12) United States Patent
Arimori et al.

(10) Patent No.: US 10,630,852 B2
(45) Date of Patent: Apr. 21, 2020

(54) IMAGE READING APPARATUS

(71) Applicant: SEIKO EPSON CORPORATION, Tokyo (JP)

(72) Inventors: Kazuhiko Arimori, Kitakyushu (JP); Kazuya Yoshikaie, Kitakyushu (JP); Kosuke Nomoto, Fukutsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/143,968

(22) Filed: Sep. 27, 2018

(65) Prior Publication Data

US 2019/0104228 A1   Apr. 4, 2019

(30) Foreign Application Priority Data

Sep. 29, 2017   (JP) ................................. 2017-189832

(51) Int. Cl.
*G03G 15/00* (2006.01)
*B65H 7/06* (2006.01)
*H04N 1/00* (2006.01)
*B65H 5/06* (2006.01)

(52) U.S. Cl.
CPC ......... *H04N 1/00602* (2013.01); *B65H 5/062* (2013.01); *B65H 7/06* (2013.01); *G03G 15/602* (2013.01); *B65H 2402/46* (2013.01); *B65H 2511/528* (2013.01); *B65H 2511/529* (2013.01); *B65H 2513/512* (2013.01); *B65H 2515/112* (2013.01); *B65H 2515/32* (2013.01)

(58) Field of Classification Search
CPC ............ B65H 2515/60; B65H 2220/02; B65H 2220/03; B65H 2511/416; B65H 2511/51; B65H 2220/01; B65H 2220/04; B65H 2301/331; B65H 23/0204; B65H 23/035; B65H 23/16; B65H 2511/242; B65H 2515/702; B65H 2553/412; B65H 2553/416; B65H 2557/64; B65H 2601/272; B65H 2801/36; B65H 7/14; B65H 5/062; B41J 15/046; B41J 15/16; G03G 15/602; H04N 1/00602
USPC ................................ 358/474, 498, 497, 496
See application file for complete search history.

(56) References Cited

U.S. PATENT DOCUMENTS

| 8,684,350 | B2 | 4/2014 | Sagawa et al. |
| 10,254,686 | B2* | 4/2019 | Minagawa ......... G03G 15/2028 |
| 2007/0138416 | A1* | 6/2007 | Ohta ....................... B65H 7/14 |
| | | | 250/548 |

(Continued)

FOREIGN PATENT DOCUMENTS

| CN | 102152992 | 8/2011 |
| JP | 2005-178268 A | 7/2005 |
| JP | 2009-274865 A | 11/2009 |

*Primary Examiner* — Negussie Worku
(74) *Attorney, Agent, or Firm* — Workman Nydegger (57) ABSTRACT

An image reading apparatus includes a roller that transports a document; a reading unit that reads an image of the document which is transported; a DC motor that drives the roller; and a control unit that controls the DC motor. The control unit is configured to stop driving of the DC motor in a case where a driving load value obtained when the DC motor is driven exceeds a threshold. A first threshold which is applied in a case of a first document and a second threshold which is applied in a case of a second document of which a basis weight is larger than a first basis weight are set, and the first threshold is less than the second threshold.

7 Claims, 5 Drawing Sheets

(56) References Cited

U.S. PATENT DOCUMENTS

| | | | |
|---|---|---|---|
| 2011/0175282 A1 | 7/2011 | Sagawa et al. | |
| 2011/0269085 A1* | 11/2011 | Wiker | A21B 1/40 |
| | | | 432/4 |
| 2012/0063791 A1* | 3/2012 | Iwanaga | B41J 11/006 |
| | | | 399/21 |
| 2014/0205340 A1* | 7/2014 | Yamaguchi | G03G 15/602 |
| | | | 399/396 |
| 2014/0292874 A1* | 10/2014 | Iesaki | B41J 13/0009 |
| | | | 347/16 |
| 2014/0292880 A1* | 10/2014 | Arimori | B41J 29/393 |
| | | | 347/16 |
| 2016/0059601 A1* | 3/2016 | Arimori | B41J 29/393 |
| | | | 347/19 |
| 2017/0344842 A1* | 11/2017 | Perez Munoz | B41J 15/046 |
| 2017/0366696 A1* | 12/2017 | Koyanagi | B65H 3/5284 |
| 2018/0220021 A1* | 8/2018 | Arimori | H04N 1/0464 |
| 2018/0220022 A1* | 8/2018 | Yoshikaie | H04N 1/00774 |
| 2019/0116284 A1* | 4/2019 | Yoshikaie | H04N 1/047 |

* cited by examiner

IMAGE READING APPARATUS

BACKGROUND

1. Technical Field

The present invention relates to an image reading apparatus such as a scanner that reads an image of a document.

2. Related Art

In the related art, an image reading apparatus including a transport unit that transports a document one by one along a transport path, and a reading unit that reads the document being transported by the transport unit at a position in the transport path. In such an image reading apparatus, there is a case where a so-called paper jam occurs in which the document is jammed during a transportation. Therefore, in such an image reading apparatus, a detection unit that detects a passage of the document is provided at a position in the transport path, and in a case where the detection unit does not detect the passage of the document even if a predetermined time has elapsed after the transport path starts driving, it is determined that the paper jam occurs in the transport path (for example, JP-A-2005-178268).

However, in a case where the paper jam occurs at a position far away at upstream side of a position at which the detection unit is disposed in the transport path, the detection unit cannot detect the passage of the document after the paper jam actually occurs, so that it takes a long period of time until it is determined that the paper jam occurs. Therefore, in a case where the transport unit is configured of, for example, rollers rotating by being in contact with the document, a contact state of the document, which causes the paper jam, with the rollers continuously rotating continues for a long period of time.

SUMMARY

An advantage of some aspects of the invention is to provide an image reading apparatus capable of reducing damage received by a document in a case where the document is jammed in a transport path.

Hereinafter, means of the invention and operation effects thereof will be described.

According to an aspect of the invention, there is provided an image reading apparatus including: a roller that rotates by being in contact with a document to transport the document along a transport path; a reading unit that is disposed at a position in the transport path and reads an image from the document transported by the roller; a DC motor that drives the roller; and a control unit that controls the DC motor. The roller is capable of transporting a first document of which a basis weight is a first basis weight and a second document of which a basis weight is a second basis weight larger than the first basis weight, as respective transport targets. The control unit is configured to stop driving of the DC motor in a case where a driving load value obtained when the DC motor is driven exceeds a threshold. As the threshold, a first threshold which is applied in a case where the document is the first document and a second threshold which is applied in a case where the document is the second document are set, and the first threshold is less than the second threshold.

In this configuration, when the document transported by the roller is jammed in the transport path, since the driving load value of the DC motor driving the roller increases, in a case where the increased driving load value exceeds a threshold, it is determined that the document is jammed to stop driving of the DC motor. In addition, in a case where the document is jammed in the transport path, a degree of the increase of the driving load value of the DC motor of a case where the first document of which the basis weight is relatively small is less than that of a case where the second document of which the basis weight is relatively large is jammed, so that the threshold used as a determination criterion is selectively used according to a type of the document. Therefore, even in a case where a plurality of types of documents having different basis weights are the transport targets, when the documents are jammed in the transport path, it is possible to stop the driving of the DC motor at appropriate timing before damage increases for each type of the document, so that it is possible to reduce the damage received by the document.

In the image reading apparatus, it is preferable that a plurality of thresholds be set according to a difference in a transport speed of the document by the roller.

In this configuration, for example, the transported document of a case where the transport speed is fast is easier to be jammed in the transport path than that of a case where the transport speed is slow, so that the plurality of the thresholds are set and are selectively used according to the difference in the transport speed. Therefore, it is possible to stop the driving of the DC motor at further appropriate timing.

In the image reading apparatus, it is preferable that the control unit stop the driving of the DC motor when a cumulative number of times in which the driving load value exceeds the first threshold reaches a set number of times in a case where the document is the first document, and stop the driving of the DC motor when a continuous time after the driving load value exceeds the second threshold reaches a set time in a case where the document is the second document.

In this configuration, a state of a change in the driving load value of the DC motor in a case where jamming of the document occurs has a characteristic for each type of the document having different basis weight, so that a determination method is selectively used according to the type of the document. Therefore, it is possible to stop the driving of the DC motor at further appropriate timing.

In the image reading apparatus, it is preferable that the image reading apparatus further include a detection unit that outputs a detection signal at a stage completing reading of the image by the reading unit, in which the control unit reset the cumulative number of times or the continuous time stored at a time point when the detection unit outputs the detection signal.

In this configuration, in a case where the plurality of the documents are continuously transported at predetermined time intervals, it is possible to appropriately determine jamming of the document in the middle of transport for each sheet.

In the image reading apparatus, it is preferable that the image reading apparatus further include, in an assumption that the roller and the DC motor are a first roller and a first DC motor: a second roller that rotates by being in contact with the document at an upstream side of the transport path from the first roller to transport the document to a downstream side at which the first roller is positioned, and a second DC motor that drives the second roller, in which the control unit be configured to stop driving of the second DC motor in a case where a driving load value obtained when the second DC motor is driven exceeds a threshold.

In this configuration, not only a case where the document in the middle of transport by the first roller is jammed, but also a case where the document in the middle of transport by the second roller positioned at the upstream side from the first roller is jammed in the transport path, it is possible to appropriately cope with the cases and reduce the damage of the document.

In the image reading apparatus, it is preferable that after the driving load value of the second DC motor increases after starting the transport of the document by the second roller, in a case where the driving load value of the second DC motor does not decrease even if an assumed time that the document reaches a position at which the first roller is disposed has elapsed, the control unit stop the driving of the second DC motor.

In this configuration, even in a case where the document transported by the second roller at the upstream side is in a state of being jammed in the transport path without being delivered to the first roller on the downstream side, it is possible to appropriately cope with the case and reduce the damage of the document.

In the image reading apparatus, it is preferable that after the driving load value of the second DC motor increases after starting the transport of the document by the second roller, in a case where the driving load value of the second DC motor does not decrease and further increases to exceed a threshold even if an assumed time that the document reaches a position at which the first roller is disposed has elapsed, the control unit stop the driving of the second DC motor.

In this configuration, in a case where the document transported by the second roller at the upstream side is in a state of being jammed in the transport path without being delivered to the first roller on the downstream side, particularly, in a case where the document is the second document such as thick paper, it is possible to appropriately cope with the case and reduce the damage of the document.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of an image reading apparatus will be described with reference to the drawings.

Figure 1:
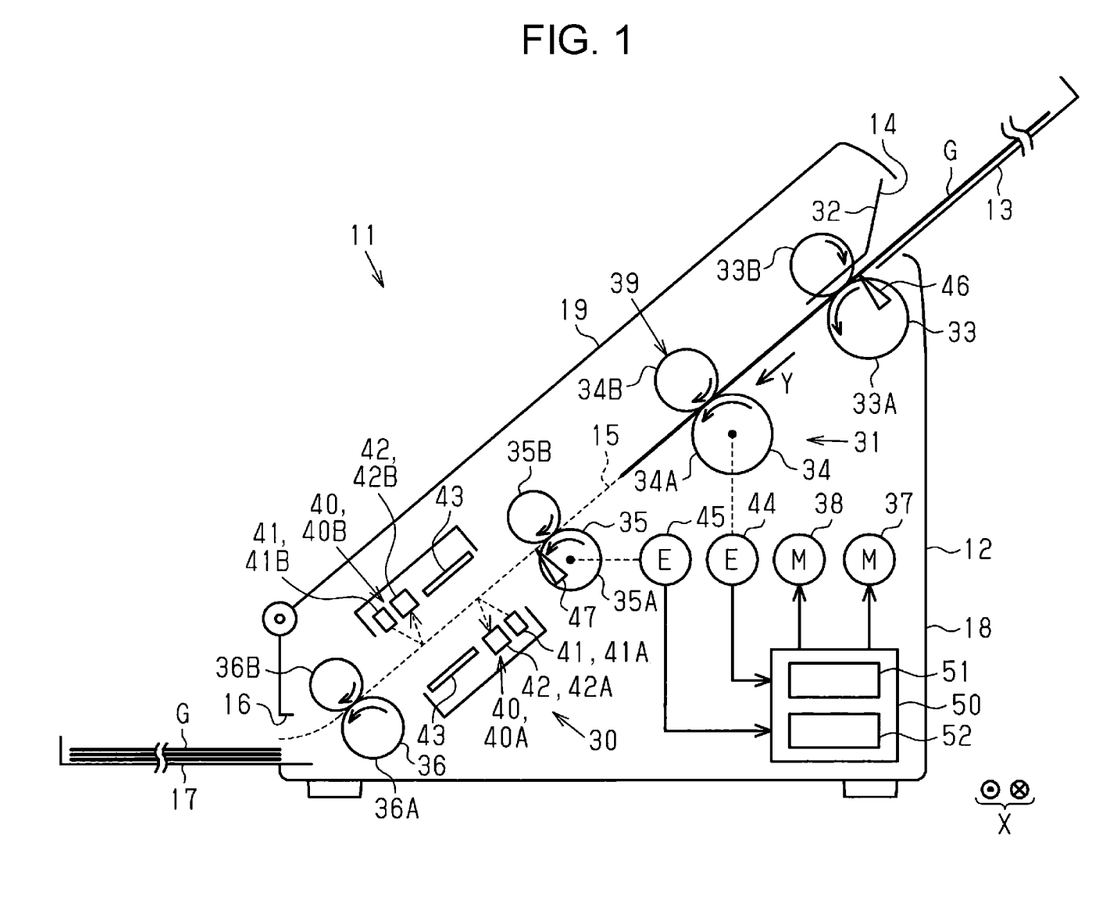
FIG. 1 is a side view schematically illustrating a schematic configuration of an embodiment of an image reading apparatus.

As illustrated in FIG. 1, an image reading apparatus 11 of the embodiment includes an apparatus body 12 (hereinafter, simply referred to as a "body 12") having a substantially trapezoidal shape in a side view, and a document support 13 on which documents G which are transported are placed (set). The documents G placed on the document support 13 are fed one by one to a feed port 14 that opens at an upper portion of the body 12. The fed document G is transported along a predetermined transport path 15 in the body 12, an image is read at a reading position in the middle of transport, and then the document G is discharged from a discharge port 16 opening to a lower portion of a front side of the body 12, and is stacked on, for example, a discharge tray 17. That is, the image of the document G is read while the document G is in the middle of transport in a transporting direction Y intersecting (particularly, orthogonal to) a width direction X of the document G in a front downward direction from the feed port 14 to the discharge port 16.

The body 12 includes a body portion 18 that is placed on a mounting surface (not illustrated) and a cover portion 19 that is connected rotatably around a front end portion of the body portion 18. In a state where the cover portion 19 is disposed at a closed position illustrated in FIG. 1, the transport path 15 extending from the feed port 14 to the discharge port 16 is formed between the body portion 18 and the cover portion 19. When a user rotates the cover portion 19 from the closed position illustrated in FIG. 1 to an open position reversed in the counterclockwise direction in FIG. 1, the transport path 15 exposes. As described above, the cover portion 19 is opened and the transport path 15 is in an exposed state, so that the user can remove the document G jammed (causing a so-called paper jam) in the transport path 15.

As illustrated in FIG. 1, an image reading processing mechanism 30 for performing image reading processing is provided in the body 12 of the image reading apparatus 11. The image reading processing mechanism 30 includes a transport unit 31 that transports the document G. The transport unit 31 feeds a plurality of the documents G stacked on the document support 13 while guiding the documents G one by one from the feed port 14 to the inside of the body 12 along a plate-like feeding guide 32, and transports the fed document G at a constant transport speed along the transport path 15.

The transport unit 31 includes a plurality of roller pairs 33 to 36 disposed at a plurality of places on the transport path 15 in the body 12. That is, the transport unit 31 includes a pair of feed roller pair 33 disposed at a position of an upstream end of the transport path 15, a pair of feed roller pair 34 disposed at a downstream side from the feed roller pair 33 in the transporting direction Y, and a pair of transport roller pair 35 disposed at an upstream side and a pair of transport roller pair 36 disposed at an downstream side in the transporting direction Y with a reading position of the document G interposed therebetween.

The feed roller pairs 33 and 34 are respectively configured of driving rollers 33A and 34A, and driven rollers 33B and 34B. In addition, the transport roller pairs 35 and 36 are respectively configured of driving rollers 35A and 36A, and driven rollers 35B and 36B. The respective driven rollers 33B to 36B rotate together with the rotation of the driving rollers 33A to 36A which are pairs therewith respectively. On the other hand, the respective driving rollers 33A to 36A are rotatably driven by using corresponding DC motors as driving sources. Moreover, among a plurality of the DC motors, a DC motor 37 (second DC motor) corresponding to the driving roller 34A (second roller) of the feed roller pair 34 and a DC motor 38 (first DC motor) corresponding to the driving roller 35A (first roller) of the transport roller pair 35 are illustrated in FIG. 1.

The driven roller 34B in the feed roller pair 34 is a retard roller and a coefficient of friction of an outer peripheral surface thereof against the document G is larger than a coefficient of friction of an outer peripheral surface of the driving roller 34A against the document G. Therefore, the feed roller pair 34 functions as a separation mechanism 39 that separates the documents G one by one and sends the document G to the downstream side of the transporting direction Y. Therefore, the plurality of the documents G stacked on the document support 13 are fed from the feed port 14 into the body 12 one by one by the rotation of the feed roller pair 33 from, for example, a lowermost one in order, and are separated one by one by the rotation the feed roller pair 34 to feed the document G to the downstream side in the transporting direction Y.

As illustrated in FIG. 1, a pair of reading units 40 is provided at the reading position in the transport path 15 formed by the feed roller pairs 33 and 34, and the transport roller pairs 35 and 36 in the body 12 on both upper and lower sides with the transport path 15 interposed therebetween. A first reading unit 40A and a second reading unit 40B configure the pair of the reading units 40 and are disposed at positions slightly shifted in the transporting direction Y to an extent that they do not face each other. The pair of the reading units 40 is configured of light sources 41 capable of irradiating light onto the document G being transported and image sensors 42 extending in a main scanning direction (width direction X). In a normal reading mode in which one surface (front surface) of the document G is read, the first reading unit 40A performs a reading operation and in a both-side reading mode in which both surfaces (front and back surfaces) of the document G are read, both the first reading unit 40A and the second reading unit 40B perform the reading operation.

The light source 41 is configured of, for example, an LED or a fluorescent lamp. The image sensor 42 is, for example, a Complementary Metal Oxide Semiconductor (CMOS) image sensor, receives a reflected light which is obtained by reflecting light emitted from the light source 41 by the document G, and converts the received light into an electric signal to output a pixel signal having a value corresponding to an amount of the received light. Moreover, the light source 41 is configured of a first light source 41A on a first reading unit 40A side and a second light source 41B on a second reading unit 40B side. In addition, the image sensor 42 is configured of a first image sensor 42A on the first reading unit 40A side and a second image sensor 42B on the second reading unit 40B side. Furthermore, a color reference plate 43 is disposed at a position facing the image sensor 42 with the transport path 15 interposed therebetween. The color reference plate 43 is provided to obtain a white reference value for shading correction and a while reference plate exhibiting white or a gray reference plate exhibiting gray is used.

In addition, as illustrated in FIG. 1, the body 12 is provided with an encoder 44 capable of detecting the rotation of the driving roller 34A of the feed roller pair 34, and an encoder 45 capable of detecting the rotation of the driving roller 35A of the transport roller pair 35. The respective encoders 44 and 45 are, for example, rotary encoders and output detection signals including a number of pulses proportional to amounts of the rotations of the corresponding driving rollers 34A and 35A. The detection signals of the encoders 44 and 45 are input into a controller 50 disposed in the body 12, and current rotation speeds and rotation positions in the DC motors 37 and 38 are calculated. In addition, the detection signals of the encoders 44 and 45 are also used for grasping a transport position which is a position of the document G in the middle of transport in the transporting direction Y by counting the number of pulses of the detection signal from a position (that is, a transport start position) at which a leading end of the document G that is a transport target is detected by the controller 50.

In addition, a document sensor 46 is disposed at a position slightly shifted upstream from a contact point between the driving roller 33A and the driven roller 33B of the feed roller pair 33 at an upstream end of the transport path 15. The document sensor 46 is configured of, for example, a contact type sensor having a lever. The document sensor 46 detects that the document G is set at the transport start position by pressing the lever of the document sensor 46 from above in a state where the leading end of the document G in the transporting direction Y, which is set in the document support 13, abuts against the contact point between the driving roller 33A and the driven roller 33B of the feed roller pair 33.

In addition, in the transport path 15, a document presence/absence sensor 47 as an example of the detection unit is disposed at a position slightly shifted downstream from a contact point between the driving roller 35A and the driven roller 35B of the transport roller pair 35. Also the document presence/absence sensor 47 is configured of, for example, a contact type sensor having a lever similar to the case of the document sensor 46. The document presence/absence sensor 47 switches from a non-detection state to a detection state by pressing the lever of the document presence/absence sensor 47 by the leading end of the document G transported in the transporting direction Y, and when the trailing end of the document G passes the lever and the level is not pressed, the detection state is switched to the non-detection state. When the document presence/absence sensor 47 switches from the non-detection state to the detection state, the document presence/absence sensor 47 outputs a detection signal indicating presence of the document and when the document presence/absence sensor 47 switches from the detection state to the non-detection state, the document presence/absence sensor 47 outputs a detection signal indicating absence of the document. The detection signal of the document presence/absence sensor 47 is used for controlling timing of start and end of the reading operation of the reading unit 40 (40A and 40B) disposed at the downstream side in the transporting direction Y. Incidentally, the detection signal of the present of the document is also used as a reset signal which is described later. Moreover, the document presence/absence sensor 47 may be a non-contact sensor such as an optical type sensor.

The controller 50 includes a control unit 51 configured of a microprocessor or the like, and a storage unit 52. The control unit 51 has a CPU that performs various calculating processes for controlling an operating state of the image reading apparatus 11 including driving control of the DC motors 37 and 38. The storage unit 52 is configured to include a ROM for storing various programs to control the operating state of the image reading apparatus 11 and a RAM for temporarily storing a work area of the CPU, a calculation result, and the like. The controller 50 (control unit 51) controls driving of the DC motors 37 and 38, the light source 41 and the image sensor 42 configuring the reading unit 40 (40A and 40B). In addition, the controller 50 controls the image reading apparatus 11 based on an operation signal from an operation unit (not illustrated) by the user.

As illustrated in FIG. 1, the document G is transported by the plurality of the roller pairs 33 to 36 from the document support 13 in the transport path 15 in the transporting direction Y, and an image is read by the reading unit 40 at the reading position in the middle of transport. In such a case, in order to normally read the image from the document G, it is necessary to transport the document G at a constant speed at the reading position. Therefore, it is preferable that rotation speeds of the DC motors 37 and 38 driving the driving rollers 33A to 36A of the respective roller pairs 33 to 36 be constantly maintained. Thus, in the embodiment, a voltage applied to the DC motors 37 and 38 is controlled by a Pulse Width Modulation (PWM).

That is, the driving of the DC motors 37 and 38 is controlled by applying a voltage only during an on-time based on a pulse-shaped signal that repeats on and off of at a predetermined switching cycle. Here, a ratio of the on-time in the switching cycle is referred to as a "duty". The duties of DC motors 37 and 38 are adjusted so as to follow a target speed curve including an acceleration region, a constant speed region, and a deceleration region, so that the rotation speed is controlled.

The control unit 51 performs Proportional Integral Differential (PID) control for converging the current rotation speed to a target rotation speed at respective rotation positions of the respective DC motors 37 and 38. If a difference between the target rotation speed and the current rotation speed is large, the duty becomes large and if the difference between the target rotation speed and the current rotation speed is small, the duty becomes small. In other words, in a case where loads of the DC motors 37 and 38 are large and the difference between the target rotation speed and the current rotation speed is large, duty values that are examples of the driving load values of the DC motors 37 and 38 become large. Conversely, in a case where loads of the DC motors 37 and 38 are small and the difference between the target rotation speed and the current rotation speed is small, the duty values that are examples of the driving load values of the DC motors 37 and 38 become small.

The embodiment focuses on a point that the duty value (or a current value) that is an example of the driving load value increases because a load increases due to frictional resistances of the driving rollers 33A to 36A rotating by being in contact with the document G in a state of being jammed when the document G is in a jammed state (so-called paper jam state) in the transport path 15. It is determined that the document G is jammed when the driving load value (duty value or current value) exceeds a predetermined threshold.

Next, an operation of the image reading apparatus 11 having such a configuration will be described focusing on a corresponding process of a case where the document G particularly during transport is jammed in the transport path 15.

Moreover, when the document G is transported, all the driving rollers 33A to 36A in the transport path 15 are rotatably driven by the corresponding DC motors, but hereinafter, description will be given focusing on the DC motor 37 (second DC motor) and the DC motor 38 (first DC motor) for driving the driving roller 34A (second roller) and the driving roller 35A (first roller). In addition, a plurality of the documents G are continuously transported at predetermined intervals and, hereinafter, a case where a first document G is normally transported and then a second document G is jammed in the transport path 15 will be described.

In order to transport the document G toward the reading position, in a case where the driving roller 34A (second roller) positioned at the upstream side and the driving roller 35A (first roller) positioned at the downstream side are rotatably driven, a voltage is applied to the DC motor 37 (second DC motor) and the DC motor 38 (first DC motor). That is, the control unit 51 applies a voltage to the DC motor 37 (second DC motor) and the DC motor 38 (first DC motor) by the PID control. In this case, current values of the DC motor 37 (second DC motor) and the DC motor 38 (first DC motor) respectively change so as to follow the target speed curves which are respectively set, but it shows a different change in a case where the document G of the transport target is normally transported and in a case where the document G is jammed in the transport path 15.

Figure 2:
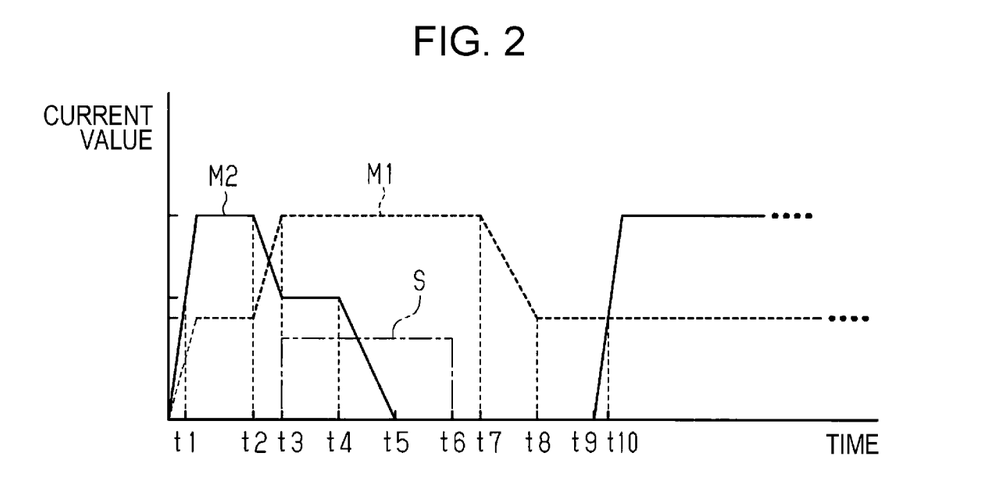
FIG. 2 is a graph illustrating a change in driving load values of a first DC motor and a second DC motor in a case where a document which is transported is a first document.

That is, as illustrated in FIG. 2, the current values of the DC motor 37 (second DC motor) and the DC motor 38 (first DC motor) start to increase when a voltage is applied. Moreover, FIG. 2 is a graph illustrating changes in the current values (driving load values) of the DC motor 37 (second DC motor) and the DC motor 38 (first DC motor) in a case where the document G that is the transport target is a first basis weight document such as thin paper of which a basis weight is a first basis weight that is relatively small. In FIG. 2, a graph M2 of a solid line illustrates a change in the current value (driving load value) of the DC motor 37 (second DC motor), a graph M1 of a broken line illustrates a change in the current value (driving load value) of the DC motor 38 (first DC motor), and a graph S of an one-dotted chain line illustrates a change in the detection signal output from the document presence/absence sensor 47.

As illustrated in FIG. 2, first, the driving roller 34A (second roller) at the upstream side and the driving roller 35A (first roller) at the downstream side are not in contact with the document G yet and are in a no-load state being rotated. Therefore, the current values of both the DC motor 37 (second DC motor) and the DC motor 38 (first DC motor) increase along the target speed curves respectively set in the acceleration region. In this state, if there is no contact with the document G fed from the upstream, the current values of both the DC motor 37 (second DC motor) and the DC motor 38 (first DC motor) transit in the constant speed region at predetermined current valve levels, but if the corresponding roller is in a load state in which the corresponding roller is in contact with the document G and rotates, the current value further increases.

That is, first, at a time t1, since the driving roller 34A (second roller) at the upstream side is in the load state in which the driving roller 34A is in contact with the first document G and rotates, as illustrated in the graph M2 of the solid line, only the current value of the DC motor 37 (second DC motor) increases and then transits the constant speed region at a current value level at the time of the load state. On the other hand, since the first document G does not reach the driving roller 35A (first roller) at the downstream side, the current value of the DC motor 38 (first DC motor) transits the constant speed region at a current value level at the time of a no-load state.

At a time t2, when the first document G is delivered from the driving roller 34A (second roller) at the upstream side to the driving roller 35A (first roller) at the downstream side, as illustrated in the graph M2 of the solid line, the load of the DC motor 37 (second DC motor) is decreased and the current value decreases. At a time t3 at which the detection signal of the presence of the document is output from the document presence/absence sensor 47, the current value of the DC motor 37 (second DC motor) transits the constant speed region at the current value level at the time of the no-load state.

On the other hand, the DC motor 38 (first DC motor) is in the load state in which the corresponding driving roller 35A (first roller) is in contact with the first document G at the time t2, so that as illustrated in the graph M1 of the broken line, the current value increases from the time t2 to the time t3. Thereafter, at the time t3, the current value of the DC motor 38 (first DC motor) transits the constant speed region at the current value level at the time of the load state.

Thereafter, at a time t4, the current value of the DC motor 37 (second DC motor), as illustrated in the graph M2 of the solid line, decreases in the deceleration region. Thereafter, at a time t5, the application of the voltage of the DC motor 37 (second DC motor) is stopped and the current value thereof becomes zero, and then the current value transits the state. Thereafter, at a time t6, the first document G passes through the reading position and a detection signal without the document is output from the document presence/absence sensor 47. Then, the DC motor 38 (first DC motor) is in the no-load state in which the corresponding driving roller 35A (first roller) rotates without being in contact with the document G, so that as illustrated in the graph M1 of the broken line, the current value decreases in the deceleration region from an immediately following time t7 to a time t8. After the time t8, the current value of the DC motor 38 (first DC motor) transits the constant speed region at the current value level of the no-load state.

As described above, when the first document G is normally transported and passes through the reading position, next, the transport of the second document G is started. That is, at a time t9, the DC motor 37 (second DC motor) which is in a state where the current value is zero from the time t5 is in the acceleration region again with the application of the voltage and the current value is increased. Then, at a time t10, the driving roller 34A (second roller) at the upstream side is in the load state of being in contact with the second document G and rotating, so that as illustrated in the graph M2 of the solid line, the current value of the DC motor 37 (second DC motor) increases and then the current value transits the constant speed region at the current value level at the time of the load state. On the other hand, the current value of the DC motor 38 (first DC motor) does not change from the time t8 and even after the time t9 and the time t10, the transition of the constant speed region at the current value level in the no-load state continues.

Thereafter, when the second document G is delivered from the driving roller 34A (second roller) at the upstream side to the driving roller 35A (first roller) at the downstream side, similar to the transport of the first document G, the current value of the DC motor 37 (second DC motor) starts to decrease from the time point. However, if the second document G is jammed in the transport path 15 and the second document G is not delivered from the driving roller 34A (second roller) on the upstream side to the driving roller 35A (first roller) on the downstream side, the decrease in the current value of the DC motor 37 (second DC motor) does not start.

That is, after the current value of the DC motor 37 (second DC motor) further increases from the time t9 at which the transport of the document G is started by the driving roller 34A (second roller) to the time t10, the current value of the DC motor 37 (second DC motor) does not decrease even if a predetermined time period in which the document G is supposed to reach a position at which the driving roller 35A (first roller) on the downstream side is disposed has elapsed.

In the embodiment, in such a case, the control unit 51 determines that the document G is jammed in the transport path 15 and stops the driving of the DC motor 37 (second DC motor). Therefore, thereafter, since the driving roller 34A (second roller) which is rotated in a state of being in contact with the document G stops the rotation, receiving of strong damage such as tearing of the document G, which is jammed in the transport path 15, is suppressed.

Meanwhile, in the image reading apparatus 11 of the embodiment, the plurality of the documents G having different basis weights are capable of being transported. Therefore, next, a case where the second document G such as thick paper, of which the basis weight is a second basis weight larger than the first basis weight of the first document G, is jammed in the transport path 15 will be described.

Figure 3:
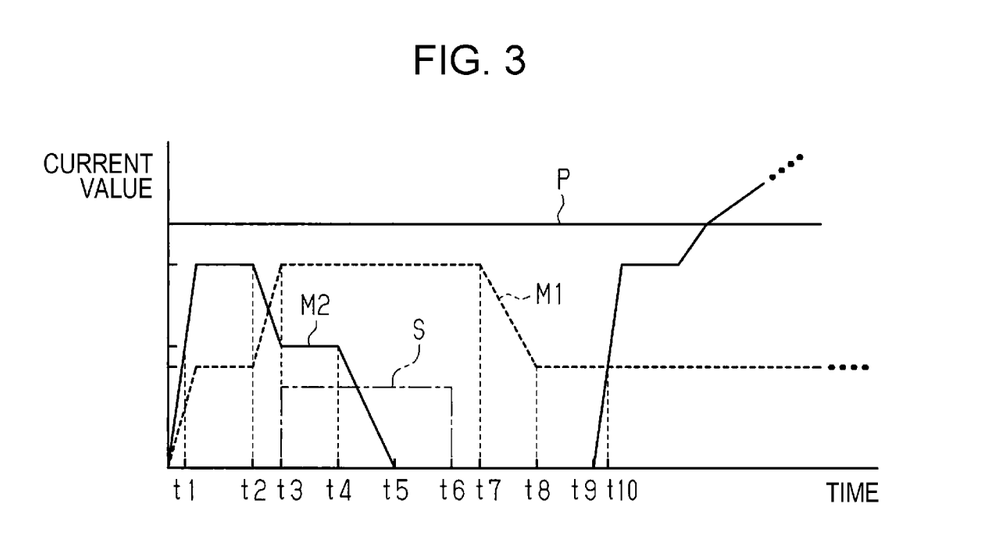
FIG. 3 is a graph illustrating a change in driving load values of the first DC motor and the second DC motor in a case where a document which is transported is a second document.

As illustrated in FIG. 3, also in this case, when a voltage is applied, the current values of the DC motor 37 (second DC motor) and the DC motor 38 (first DC motor) respectively start to increase. Similar to the case of the first document G, after the first document G is normally transported, the second document G is transported, so that at the time t9, the DC motor 37 (second DC motor) driving the driving roller 34A (second roller) at the upstream side is in the acceleration region again with the application of the voltage and the current value is increased. Then, at the time t10, the driving roller 34A (second roller) at the upstream side is in the load state of being in contact with the second document G and rotating, so that as illustrated in the graph M2 of the solid line, the current value of the DC motor 37 (second DC motor) increases and then the current value transits the constant speed region at the current value level at the time of the load state. On the other hand, similar to the case of the first document G, the current value of the DC motor 38 (first DC motor) does not change from the time t8 and even after the time t9 and the time t10, the transition of the constant speed region at the current value level in the no-load state continues.

In this case, in a case where the second document G such as thick paper is jammed in the transport path 15 during the transport, since the basis weight is relatively large, a frictional resistance against the document G also increases in the driving roller 34A (second roller) which is in contact with the document G and rotates. Therefore, the current value of the DC motor 37 (second DC motor), which transits the constant speed region at the current value level in the load state, further increases and exceeds a threshold P which is set in advance.

That is, after the current value of the DC motor 37 (second DC motor) further increases from the time t9 at which the transport of the document G is started by the driving roller 34A (second roller) to the time t10, the current value of the DC motor 37 (second DC motor) does not decrease even if a predetermined time period in which the document G is supposed to reach a position at which the driving roller 35A (first roller) on the downstream side is disposed has elapsed. The current value further increases without decreasing and then exceeds the predetermined threshold P. In the embodiment, in such a case, the control unit 51 determines that the document G is jammed in the transport path 15 and stops the driving of the DC motor 37 (second DC motor). Therefore, particularly, in a case where the transport target is the second document G such as thick paper, since the driving roller 34A (second roller) which is rotated in a state of being in contact with the document G stops the rotation, receiving of strong damage such as tearing of the document G, which is jammed in the transport path 15, is suppressed.

As described above, in the image reading apparatus 11 of the embodiment, presence or absence of the jammed state of the document G can be determined based on the change in the current values of the DC motor 37 (second DC motor) and the DC motor 38 (first DC motor) respectively driving the driving roller 34A (second roller) and the driving roller 35A (first roller) adjacent to each other at the upstream side and the downstream side of the transport path 15. That is, the presence or absence of the jammed state of the document G is determined based on the change in the current value of the DC motor 37 (second DC motor) from a time point at which the document G is supposed to be delivered from the driving roller 34A (second roller) at the upstream side to the driving roller 35A (first roller) on the downstream side.

However, in the embodiment, in a case where the document G is jammed in the transport path 15, the determination can be performed even by another method. That is, it is possible to determine the presence or absence of the jammed state of the document G based on a change in the duty value in the PWM control in each of the DC motors 37 and 38 (first and second DC motors) that drives each of the driving rollers 34A and 35A regardless of the presence or absence of delivery of the document G between the driving roller 34A (second roller) and the driving roller 35A (first roller). As an example, the determination method will be described below focusing on the duty value (type of the driving load value) in the PWM control in the DC motor 38 (first DC motor) that drives the driving roller 35A (first roller) of the transport roller pair 35.

Figure 4:
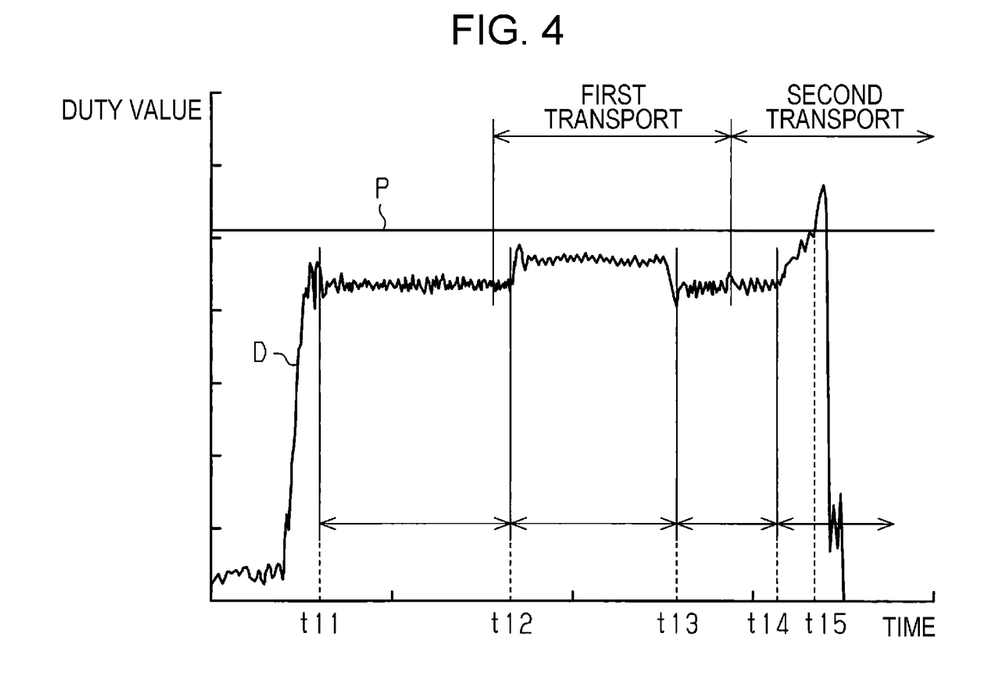
FIG. 4 is a graph illustrating a change in a driving load value of a DC motor.

As illustrated in FIG. 4, in a case where a difference between the target rotation speed and the current rotation speed increases in the acceleration region, a duty value D that is a value of the ratio of the on-time in the switching cycle of the PWM control increases substantially proportional to the case. At a time t11, the duty value D of the DC motor 38 (first DC motor) transits the constant speed region at a duty value level in the no-load state because the driving roller 35A (first roller) rotates without being in contact with the document G yet.

When the first document G is transported from the upstream side and is in contact with the driving roller 35A (first roller) at a time t12, as illustrated in FIG. 4, thereinafter, the duty value D transits the constant speed region at the duty value level in the load state. This is because the frictional resistance in the driving roller 35A (first roller) increases due to contact with the document G. When the duty value D transits the constant speed region at the duty value level in the load state, and then the document G is separated from the driving roller 35A (first roller) at a time t13, the duty value D transits the constant speed region at the duty value level in the no-load state again. When the second document G is transported from the upstream side in the middle of transport and is in contact with the driving roller 35A (first roller) at a time t14, the frictional resistance increases to increase the duty value D.

In this case, in a case where the second document G which is in contact with the driving roller 35A (first roller) while the driving roller 35A (first roller) rotates is in the jammed state in the transport path 15, since the frictional resistance further increases, the duty value D of the DC motor 38 (first DC motor) exceeds a predetermined threshold P at a time t15. In the embodiment, in this case, the control unit 51 determines that the document G is jammed in the transport path 15 and stops the driving of the DC motor 38 (first DC motor). Therefore, thereinafter, since the driving roller 35A (first roller) which is rotated in a state of being in contact with the document G stops the rotation, receiving of strong damage such as tearing of the document G, which is jammed in the transport path 15, is suppressed.

Figure 5:
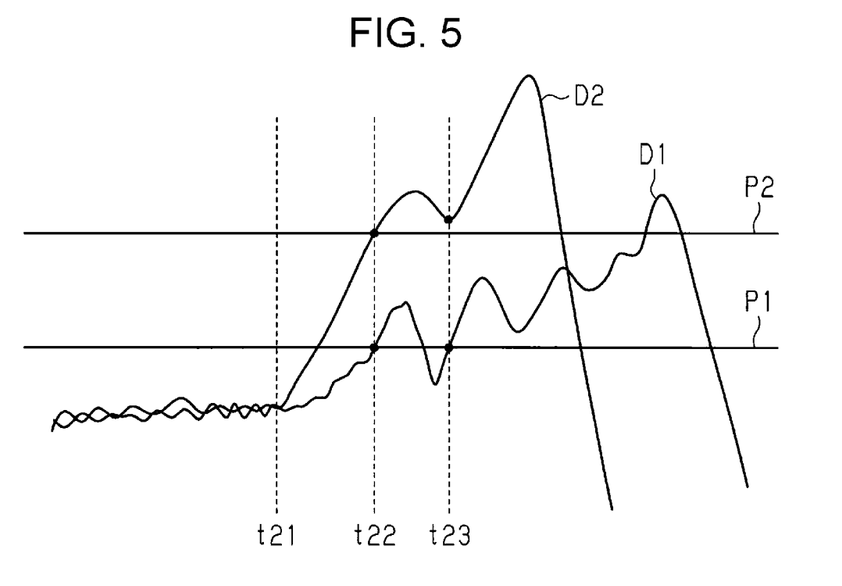
FIG. 5 is a graph illustrating a change in a driving load value of a DC motor which is different for each type of the document.

Meanwhile, the document G is jammed in the transport path 15 so that, as described above, when the duty value D of the DC motor 38 (first DC motor) is in a state of exceeding the threshold P, there are differences in aspects when the duty value D exceeds the threshold P depending on the type of the document G. In this regard, the description will be given below with reference to FIG. 5. A change in a first duty value D1 and a first threshold P1 in a case where the transport target is the first document G such as thin paper, and a change in a second duty value D2 and a second threshold P2 in a case where the transport target is the second document G such as thick paper are illustrated in FIG. 5. In addition, the first threshold P1 applied to the first document G such as thin paper is less than the second threshold P2 applied to the second document G such as thick paper. The reason is that an amount of increase in the first duty value D1 in a case where the first document G such as thin paper is jammed in the transport path 15 is small, so that the damage of the first document G increases during a period until it is determined that the jammed state is in effect and the driving of the DC motor 38 (first DC motor) is stopped at a threshold that is the same as the second threshold P2 applied to a case of the second document G such as thick paper.

As illustrated in FIG. 5, in a case where the first document G with which the driving roller 35A (first roller) is in contact while rotating is in the jammed state in the transport path 15, the first duty value D1 of the DC motor 38 (first DC motor) starts to increase at a time t21. The first duty value D1 that continues to increase as it is exceeds the first threshold P1 at a time t22. If it is determined that the first document G is jammed in the transport path 15 with exceeding the one threshold, even in a case where the first document G is transported from the upstream side, abuts against the driving roller 35A (first roller), and then is normally transported, there is a possibility of exceeding the first threshold P1, so that there is a concern that the determination is erroneous.

Therefore, in the embodiment, in a case where the transport target is the first document G such as thin paper, if the cumulative number of times exceeding the threshold is not set once but is set a plurality of times (for example, twice), it is determined that the first document G such as thin paper is jammed in the transport path 15 and the driving of the DC motor 38 (first DC motor) is stopped based on the determination. That is, unlike the second document G such as thick paper, this is because the first document G such as thin paper is liable to be unstable in behavior when the driving roller 35A (first roller) is in contact with the first document G and rotates in the jammed state, and the first duty value D1 of the DC motor 38 (first DC motor) also tends to vertically fluctuate little by little. Therefore, as illustrated in FIG. 5, after the first duty value D1 once exceeding the first threshold P1 at a time t22 decreases after the time t22 and is equal to or less than the first threshold P1, it is determined that the first document G is jammed in the transport path 15 when the first duty value D1 exceeds the first threshold P1 for a second time at a time t23.

On the other hand, in a case of the second document G in which the transport target is thick paper or the like, unlike the case of the first document G such as thin paper, the second document G is unlikely to be unstable in behavior when the driving roller 35A (first roller) is in contact with the second document G and rotates in the jammed state, and the second duty value D2 of the DC motor 38 (first DC motor) also never falls equal to or less than the second threshold P2 after exceeding the threshold. Therefore, in a case where the transport target is the second document G such as thick paper, in a case where a continuous time after exceeding the second threshold P2 instead of the cumulative number of times exceeding the threshold is a set time (for example, a time from the time t22 to the time t23), it is determined that the second document G is jammed in the transport path 15 and the driving of the DC motor 38 (first DC motor) is stopped based on the determination. Moreover, as described above, the control unit 51 determines whether or not the driving of the DC motor 38 (first DC motor) is stopped based on the presence or absence of the jammed state of the document G.

Next, a control processing routine of a DC motor (in this case, as an example, the DC motor 38 (first DC motor) that drives the DC motor the driving roller 35A (first roller) of the transport roller pair 35), which is executed by the control unit 51 in the middle of transport of the document G, will be described with reference to a flowchart illustrated in FIG. 6.

Figure 6:
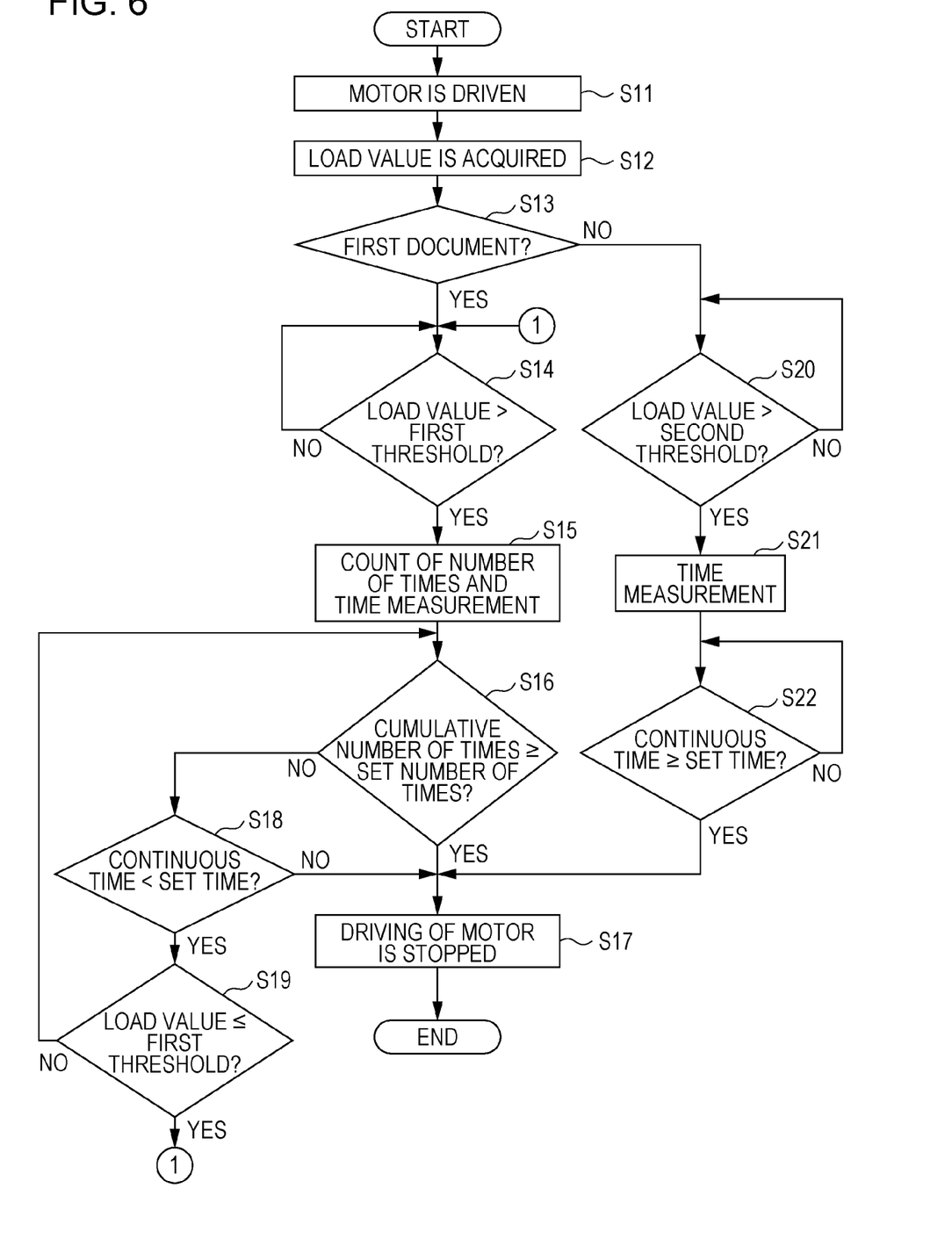
FIG. 6 is a flowchart illustrating a driving control routine of a DC motor.

As illustrated in FIG. 6, when the document G is transported by the driving roller 35A (first roller), in step S11, the control unit 51 drives the DC motor 38 (first DC motor) based on transport information input from an external terminal (not illustrated) (personal computer or the like). That is, a voltage is applied to the DC motor 38 (first DC motor) by the PWM control. Then, the driving roller 35A (first roller) of the transport roller pair 35 starts to rotate and the duty value that is the driving load value (abbreviated as a "load value" in FIG. 6) of the DC motor 38 (first DC motor) starts to increase. In the next step S12, the control unit 51 acquires the duty value (driving load value) of the DC motor 38 (first DC motor).

In the next step S13, the control unit 51 determines whether or not the document G that is the transport target is the first document G such as thin paper based on type information of the document included in the transport information. As a result, in a case where the transport target is the first document G (S13=YES), in the next step S14, the control unit 51 determines whether or not the duty value D (in this case, the first duty value D1) exceeds the first threshold P1. In a case where the duty value D does not exceed the first threshold P1 yet (S14=NO), the control unit 51 repeats the determination of step S14 periodically. In a case where the first duty value D1 exceeds the first threshold P1 (S14=YES), the control unit 51 causes the process to proceed to the next step S15.

In step S15, the control unit 51 counts the cumulative number of times that the first duty value D1 exceeds the first threshold P1, causes the storage unit 52 to store the cumulative number of times, measures the continuous time elapsed in a state where the first duty value D1 exceeds the first threshold P1, and causes the storage unit 52 to store the continuous time. In the next step S16, the control unit 51 determines whether or not the cumulative number of times is equal to or larger than the set number of times (for example, twice) stored in the storage unit 52 in advance. As a result, in a case where the cumulative number of times is equal to or larger than the set number of times (S16=YES), in the next step S17, the control unit 51 complicates the process of the routine after the driving of the DC motor 38 (first DC motor) is stopped.

On the other hand, in a case where the cumulative number of times is less than the set number of times (S16=NO), the control unit 51 causes the process to proceed to step S18. The control unit 51 determines whether or not the continuous time elapsed in a state where the first duty value D1 exceeds the first threshold P1 is less than the set time stored in the storage unit 52 in advance. As a result, in a case where the continuous time elapsed after exceeding the first threshold P1 is equal to or larger than the set time (S18=NO), the control unit 51 estimates that the first document G is jammed in the transport path 15, causes the process to proceed to step S17, stops the driving of the DC motor 38 (first DC motor), and then completes the process of the routine.

In addition, in a case where the continuous time elapsed after exceeding the first threshold P1 is less than the set time (S18=YES), in the next step S19, the control unit 51 determines whether or not the first duty value D1 exceeding the first threshold P1 decreases and then is equal to or less than the first threshold P1. As a result, in a case where the first duty value D1 is equal to or less than the first threshold P1 (S19=YES), the control unit 51 causes the process to return to the previous step S14 and the subsequent process to repeat. On the other hand, in a case where the first duty value D1 is not equal to or less than the first threshold P1 (S19=NO), the control unit 51 causes the process to return to the previous step S16 and the subsequent process to repeat.

In addition, in the determination result in the previous step S13, in a case where the transport target is not the first document G (S13=NO), the control unit 51 causes the process to proceed to step S20 and determines whether or not the duty value D (in this case, the second duty value D2) exceeds the second threshold P2. In a case where the duty value D does not exceed the second threshold P2 yet (S20=NO), the control unit 51 repeats the determination of step S20 periodically. In a case where the second duty value D2 exceeds the second threshold P2 (S20=YES), the control unit 51 causes the process to proceed to the next step S21.

In step S21, the control unit 51 measures the continuous time elapsed in a state where the second duty value D2 exceeds the second threshold P2, and causes the storage unit 52 to store the continuous time. In the next step S22, the control unit 51 determines whether or not the continuous time is equal to or larger than the set time stored in the storage unit 52 in advance. As a result, in a case where the continuous time is less than the set time (S22=NO), the control unit 51 repeats the determination of step S22 periodically. In a case where the continuous time is equal to or larger than the set time (S22=YES), the control unit 51 causes the process to proceed to step S17, stops the driving of the DC motor 38 (first DC motor), and then completes the process of the routine. Moreover, information regarding the cumulative number of times and the continuous time temporarily stored in the storage unit 52 in step S15 and step S21 is erased from the storage unit 52 with the signal as a reset signal when the detection signal of absence of the document with the passage of the document G is output from the document presence/absence sensor 47.

According to the embodiment, the following effects can be obtained.

(1) For example, when the document G with which the driving roller 35A is in contact and rotates is jammed in the transport path 15, the driving load value of the DC motor 38 that drives the roller 35A increases, so that in a case where the increased driving load value exceeds a predetermined threshold P, it is determined that the document G is jammed and the driving of the DC motor 38 is stopped. In addition, in a case where the document G is jammed in the transport path 15, the degree of increase in the driving load value of the DC motor 38 of a case where the first document G of which the basis weight is relatively small is jammed is smaller than that of a case where the second document G of which the basis weight is relatively large is jammed, so that the threshold P used as a determination criterion is also selectively used according to a type of the document G. Therefore, even in a case where a plurality of types of documents G having different basis weights are the transport targets, when the documents G are jammed in the transport path 15, it is possible to stop the driving of the DC motor 38 at appropriate timing before damage increases for each type of the document G, so that it is possible to reduce the damage received by the document G.

(2) A state of the change in the driving load values of the DC motors 37 and 38 in a case where jamming of the document G occurs has a characteristic for each type of the document G having different basis weight, so that a determination method is selectively used according to the type of the document G. Therefore, it is possible to stop the driving of the DC motors 37 and 38 at further appropriate timing.

(3) In a case where one document G passes through the reading position, a detection signal functioning as the reset signal is output from the document presence/absence sensor 47 and the information regarding the cumulative number of times and the continuous time temporarily stored in the storage unit 52 based on the output. Therefore, in a case where the plurality of the documents G are continuously transported at predetermined time intervals, it is possible to appropriately determine jamming of the document G in the middle of transport for each sheet.

(4) Not only a case where the document G in the middle of transport by the driving roller 35A (first roller) is jammed, but also a case where the document G in the middle of transport by the driving roller 34A (second roller) positioned at the upstream side from the driving roller 35A (first roller) is jammed in the transport path 15, it is possible to appropriately cope with the cases and reduce the damage of the document G.

(5) Even in a case where the document G transported by the driving roller 34A (second roller) at the upstream side is in a state of being jammed in the transport path 15 without being delivered to the driving roller 35A (first roller) on the downstream side, it is possible to appropriately cope with the case and reduce the damage of the document G.

(6) In a case where the document G transported by the driving roller 34A (second roller) at the upstream side is in a state of being jammed in the transport path 15 without being delivered to the driving roller 35A (first roller) on the downstream side, particularly, in a case where the document G is the second document G such as thick paper, it is possible to appropriately cope with the case and reduce the damage of the document G.

Moreover, the embodiment described above may be modified as indicated in the following modification examples. In addition, the configuration included in the embodiment and a configuration included in the modification examples may be arbitrarily combined or the configurations included in the modification examples may be arbitrarily combined.

For the threshold P when determining whether or not the duty values (driving load values) of the DC motors 37 and 38 exceed the threshold P, a plurality of the thresholds P may be set according to the difference in the transport speed relating to the rotation speeds of the driving rollers 34A and 35A when the document G is transported. According to the configuration, for example, the document G in the middle of transport of a case where the transport speed is fast is easier to be jammed in the transport path 15 than that of a case where the transport speed is slow, so that the plurality of the thresholds P are set and are selectively used according to the difference in the transport speed. Therefore, it is possible to stop the driving of the DC motors 37 and 38 at further appropriate timing.

Figure 7:
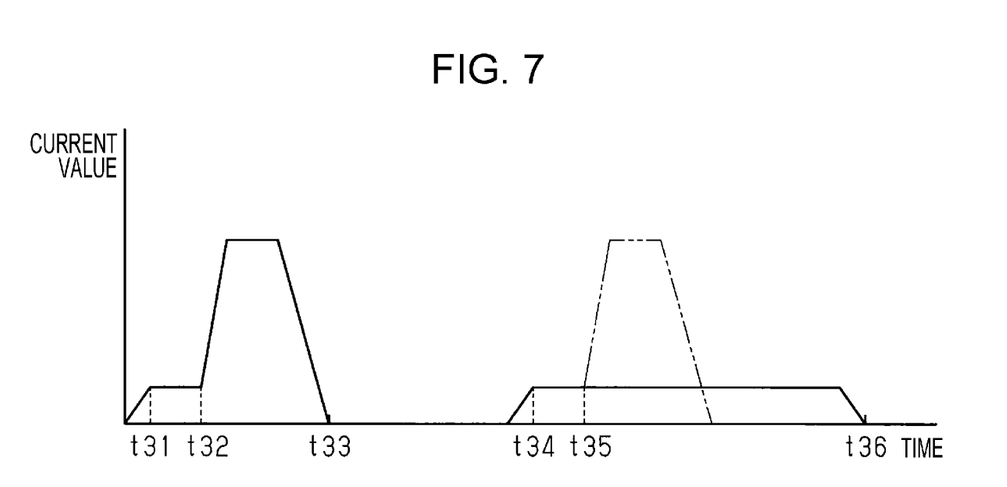
FIG. 7 is a graph illustrating a change in a driving load value of a DC motor when heat generation is limited.

As illustrated in FIG. 7, in a case where the plurality of the documents G are continuously transported at predetermined intervals, an increase in the current values of the DC motors 37 and 38 may be suppressed in the acceleration region under predetermined conditions. For example, the transport of the first document G is started at a time t31, enters the acceleration region at a time t32, and then passes the constant speed region and the deceleration region, and a current value is zero at a time t33. Thereafter, when the transport of the second document G is started at a time t34, the constant speed region may be maintained at the current value level at the time point where the document G normally enters the acceleration region at a time t35. That is, in a case where a heat generation temperature of the DC motors 37 and 38 is equal to or larger than a set temperature, when the second document G is transported, as illustrated in a two-dotted chain line in FIG. 7, the document G passes through the constant speed region of a low current value level lengthwise where the document G normally passes through the acceleration region, the constant speed region, and the deceleration region, and then the current value may be zero at a time t36, so that the current values of the DC motors 37 and 38 do not increase. In such a case, for the second document G, although the transport time becomes longer by an amount of not accelerating, unnecessary heat generation of the DC motors 37 and 38 is suppressed. Moreover, the determination whether or not the heat generation temperature of the DC motors 37 and 38 is equal to or larger than the set temperature may be detected by providing a temperature sensor, or may be estimated that the heat generation temperature is equal to or larger than the set temperature in a case where an integrated value of the current value exceeds a predetermined threshold.

After the driving load value of the DC motor 37 increases after the transport of the document G by the driving roller 34A is started, in a case where the document presence/absence sensor 47 does not detect the detection signal of the presence of the document even if an assumed time that the document G reaches the position at which the driving roller 35A on the downstream side has elapsed, the control unit 51 may determine that the document G is jammed in the transport path 15.

In a case where the cumulative number of times is less than the set number of times (S16=NO) in the determination result of step S16 in the flowchart illustrated in FIG. 6, the control unit 51 does not cause the process to proceed to step S18 and may cause the determination of step S16 to repeat periodically. In addition, in this case, in step S15, the measurement of the continuous time may be omitted.

Even in a case where the transport target is the first document G such as thin paper, the control unit 51 may determine that the first document G is jammed in the transport path 15 in a case where the continuous time that has elapsed after exceeding the first threshold P1 exceeds the set time regardless of the cumulative number of times that the first duty value D1 which is the driving load value of the DC motors 37 and 38 exceeds the first threshold P1.

In a case where the transport target is the first document G such as thin paper and in a case where the transport target is the second document G such as thick paper, the control unit 51 may apply one threshold P common to the both.

The entire disclosure of Japanese Patent Application No. 2017-189832, filed Sep. 29, 2017 is expressly incorporated by reference herein.

What is claimed is:

1. An image reading apparatus comprising:
a roller that rotates by being in contact with a document to transport the document along a transport path;
a reading unit that is disposed at a position in the transport path and reads an image from the document transported by the roller;
a DC motor that drives the roller; and
a control unit that controls the DC motor,
wherein the roller is capable of transporting a first document of which a basis weight is a first basis weight and a second document of which a basis weight is a second basis weight larger than the first basis weight, as respective transport targets,
wherein the control unit is configured to stop driving of the DC motor when a driving load value, obtained when the DC motor is driven, exceeds a first threshold which is applied in a case where the document is the first document or a second threshold which is applied in a case where the document is the second document are set, and the first threshold being less than the second threshold.

2. The image reading apparatus according to claim 1, wherein a plurality of thresholds are set according to a difference in a transport speed of the document by the roller.

3. The image reading apparatus according to claim 1, wherein the control unit stops the driving of the DC motor when a cumulative number of times in which the driving load value exceeds the first threshold reaches a set number of times in a case where the document is the first document, and stops the driving of the DC motor when a continuous time after the driving load value exceeds the second threshold reaches a set time in a case where the document is the second document.

4. The image reading apparatus according to claim 3, further comprising:
a detection unit that outputs a detection signal at a stage completing reading of the image by the reading unit,
wherein the control unit resets the cumulative number of times or the continuous time stored at a time point when the detection unit outputs the detection signal.

5. The image reading apparatus according to claim 1, further comprising, in an assumption that the roller and the DC motor are a first roller and a first DC motor:
a second roller that rotates by being in contact with the document at an upstream side of the transport path from the first roller to transport the document to a downstream side at which the first roller is positioned, and a second DC motor that drives the second roller,
wherein the control unit is configured to stop driving of the second DC motor in a case where a driving load value obtained when the second DC motor is driven exceeds a threshold.

6. The image reading apparatus according to claim 5, wherein after the driving load value of the second DC motor increases after starting the transport of the document by the second roller, in a case where the driving load value of the second DC motor does not decrease even if an assumed time that the document reaches a position at which the first roller is disposed has elapsed, the control unit stops the driving of the second DC motor.

7. The image reading apparatus according to claim 5, wherein after the driving load value of the second DC motor increases after starting the transport of the document by the second roller, in a case where the driving load value of the second DC motor does not decrease and further increases to exceed a threshold even if an assumed time that the document reaches a position at which the first roller is disposed has elapsed, the control unit stops the driving of the second DC motor.

* * * * *